March 26, 1957 C. A. HARSCH 2,786,723
CAGE LEVELING APPARATUS
Filed May 12, 1952 2 Sheets-Sheet 1

INVENTOR.
Chester A. Harsch
BY
Atty.

March 26, 1957  C. A. HARSCH  2,786,723
CAGE LEVELING APPARATUS
Filed May 12, 1952  2 Sheets-Sheet 2

INVENTOR.
Chester A. Harsch

United States Patent Office 2,786,723
Patented Mar. 26, 1957

2,786,723
CAGE LEVELING APPARATUS
Chester A. Harsch, Portland, Oreg.

Application May 12, 1952, Serial No. 287,446

12 Claims. (Cl. 304—29)

My invention relates to a pivotal boom mechanism carrying an articulated workman's cage at the terminal end thereof and, more particularly, to a novel control system for correlating the pivotal movements of the boom with the articulation of the cage in order to maintain a level disposition of the cage at all angular positions of the boom.

One object of my invention is to provide, in combination with a pivotal boom having a pivotal cage on the free end thereof, a control system serially for interconnecting the boom and cage motor mechanisms in order that the cage and boom simultaneously and automatically will be pivoted through opposite but equal arcs during normal manipulation of these two elements.

The instant invention is related to my two copending applications, Serial No. 190,479, entitled Hydraulic Telescopic Boom, now Patent Number 2,666,417, issued January 19, 1954, and Serial No. 190,480, entitled Electric Control System for Expansible Motor Operated Boom, now Patent No. 2,643,515, issued June 30, 1953, both of which were filed October 17, 1950. In said applications, there is described a portable or mobile boom mechanism which is hydraulically actuated to three independent paths of movement: up and down, side to side, and in and out. This boom, in the main, is used by utility maintenance crews and a self-leveling workman's cage is carried at the terminal end thereof. Duplicate controls are provided in the cage and adjacent the base of the boom, the base conventionally being carried upon a truck chassis. With this mechanism, costly and laborious pole climbing is eliminated by placing a workman, together with his tools, in the cage and by manipulating the boom until the workman is elevated to a position directly adjacent a street lamp, telephone pole cross-tie, or other elevated work area. Further, by proper manipulation, the boom is capable of performing additional varied and hitherto costly tasks for public utility companies. These tasks may include tree trimming operations, midspan line repair and reinstallation, street light moving or servicing, high position painting, and telephone pole maintenance. As a common attribute of each of these tasks, it will be noted that the workman's cage should be maintained level and in a horizontal position irrespective of the tilt or angular disposition of the boom itself. Accordingly, the instant invention is concerned with an improved leveling mechanism and a positive, accurate control therefor whereby the workman's cage of a boom such as is described in my two previous applications continuously and automatically is maintained in a level position irrespective of the angular disposition or tilt of the boom.

Heretofore, various types of leveling mechanisms have been tried and found wanting in one or more particulars. One such mechanism utilizes a mechanical linkage intermediate the workman's cage and the end of the boom. For example, a parallelogram or triangle-type linkage may be arranged so as to level the cage as the boom is pivoted up and down. One difficulty with this type of mechanism is that the inherent weight of the linkage itself requires that the boom be formed with what I consider to be over-massive or excessive structural strength. By way of example, one commercial model of the boom of the instant invention is capable of extension to a 32 foot reach and, in the fully extended position, is capable of supporting either 300 or 500 pounds in the workman's cage at the free end of the boom. However, if an elaborate parallelogram or triangular linkage mechanism also must be carried at the free end, the structural strength must be increased and the resultant fabrication problems and increased cost tend to price the boom out of the market. Further, if the boom is mounted upon a truck chassis, the workman's cage must be pivoted to a horizontal position while the truck travels the highway in order to avoid collision with overhead lines and spans. With the typical mechanical linkage mechanism, such a horizontal disposition of the cage is impossible of achievement unless the linkage itself is completely disassembled from engagement with the cage. In short, the leveling mechanism and control of the instant invention overcomes the above problems which are inherent in a mechanical linkage and, in particular, is an improvement upon such mechanical mechanisms.

The second type of leveling mechanism heretofore tried and found wanting includes a pair of identical expansible hydraulic motors, one of which interconnects the lower end of the boom and the base support member and the other of which interconnects the cage and the free end of the boom. These expansible motors are interconnected by two hydraulic conduits, independently of the hydraulic controls for the three movements of the boom, such that an angular tilt of the boom itself exactly is reproduced with an opposite angular tilt of the cage. Thus, the cage is maintained in a level position so long as the expansible motors initially have been set to a correct position. However, here again it is difficult to pivot the cage to a horizontal position so as to avoid overhead obstacles when the boom is mounted upon a truck. Further, I have tried this type of leveling mechanism and have found in actual use that a continuous inspection and adjustment must be made in order that the two expansible motors are correlated and set correctly prior to use. For example, if one motor is midway in a stroke while the other is adjacent one end, pivotal movement of the boom will cause one motor to reach the end of a stroke short of a full swing of the boom. This termination of the stroke will increase the hydraulic pressures in the motors and conduits and, in actual practice, it has been known to burst a hose or to break a portion of the expansible motor linkage. What is even more important, however, is that this expansible motor type of leveling mechanism requires the use of a separate duplicate hydraulic system and of separate duplicate lead and follow motors, thus increasing both the complexity of fabrication and the cost of a complete boom.

Having in mind the last named disadvantages, it is one object of my invention to provide a hydraulic cage leveling mechanism whereby one of the operating motors for the boom itself is utilized as an actuating element to operate a short expansible leveling motor which is joined to the cage. Thus, in contrast to previous hydraulic leveling controls, my inventive mechanism completely eliminates one expansible motor and, by correlating the hydraulic controls for the boom operation and leveling mechanism, it effects a more precise and a more accurate leveling operation while requiring less upkeep and repair.

To the above ends, the leveling system of the instant invention includes a telescopic boom having a first motor means for pivoting the boom between a horizontal and a vertical position. Additionally, a normally level cage is carried upon the free end of the boom and is provided with a second motor means for pivoting the cage in an arc. Novel control means serially interconnect the first and second motor means simultaneously for pivoting the cage and the boom through opposite equal arcs in order to level the cage automatically and continuously at all angular dispositions of the boom. Further, a manual control valve may be joined to the second motor in order initially to adjust the level of the cage or to pivot the cage into a horizontal position when obstructions are to be avoided while the boom is moved along a public highway. Still further, my inventive control mechanism employs a relatively small expansible motor adjacent the terminal end of the boom in order that larger payloads may be carried by the cage and in order that smaller and less expensive boom structures may be employed.

These and other objects and advantages of my invention will become apparent in the following detailed description, taken in conjunction with the accompanying drawings, in which.

Figure 2:
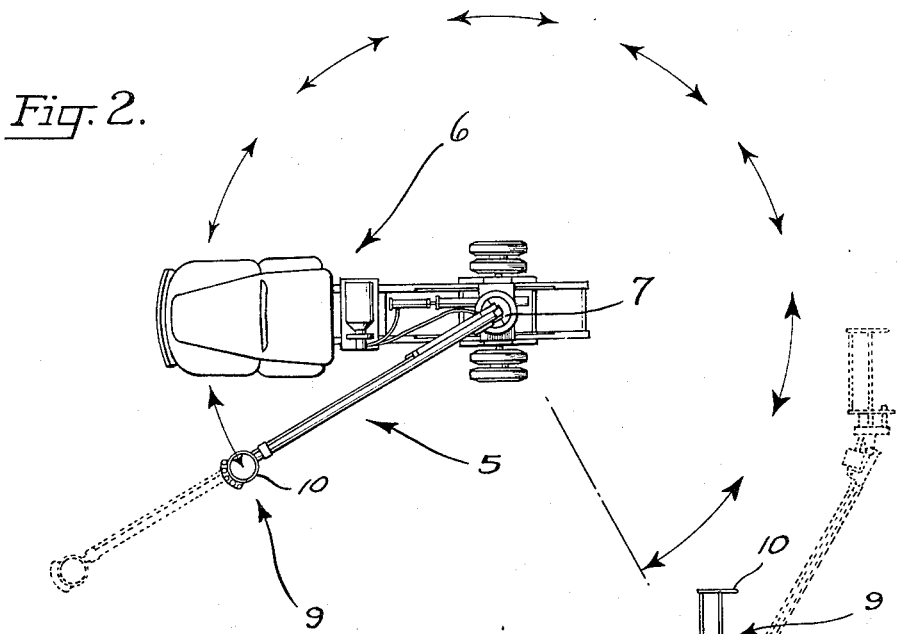
Fig. 2 is a plan view, similar to Fig. 1, showing the boom in a different position and indicating, by double ended arrows, the rotary swinging movements of which the boom is capable.
Figure 1:
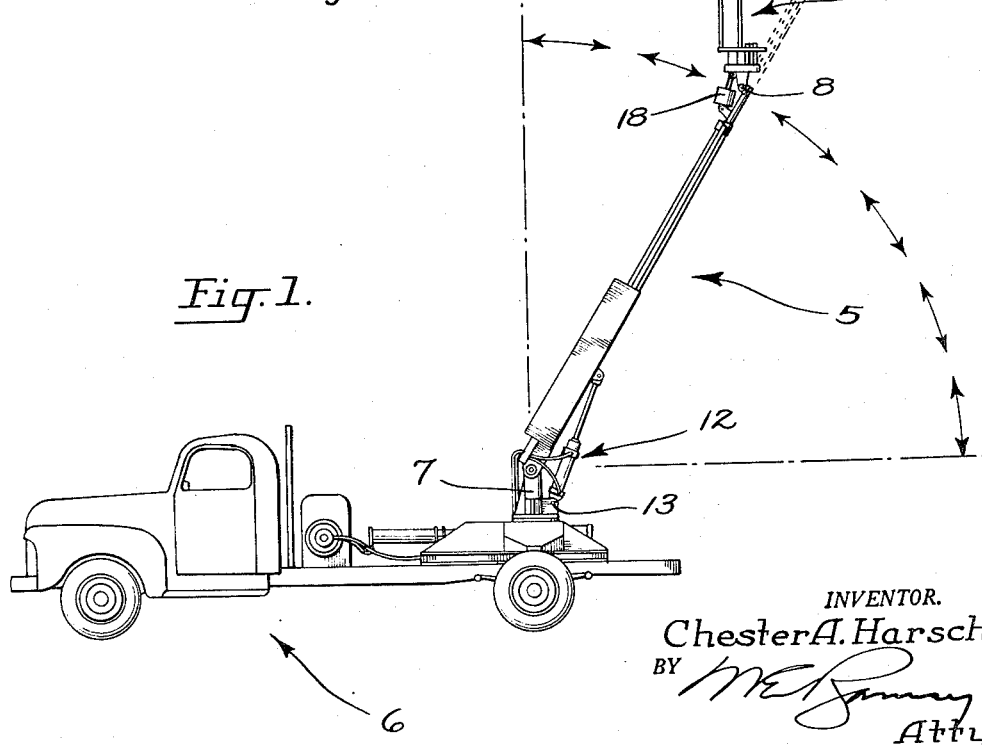
Fig. 1 is a side view of a typical portable or mobile boom as it is mounted upon a truck chassis, the arcuate movement of the boom between a horizontal and a vertical position being indicated by double ended arrows.
Figure 4:
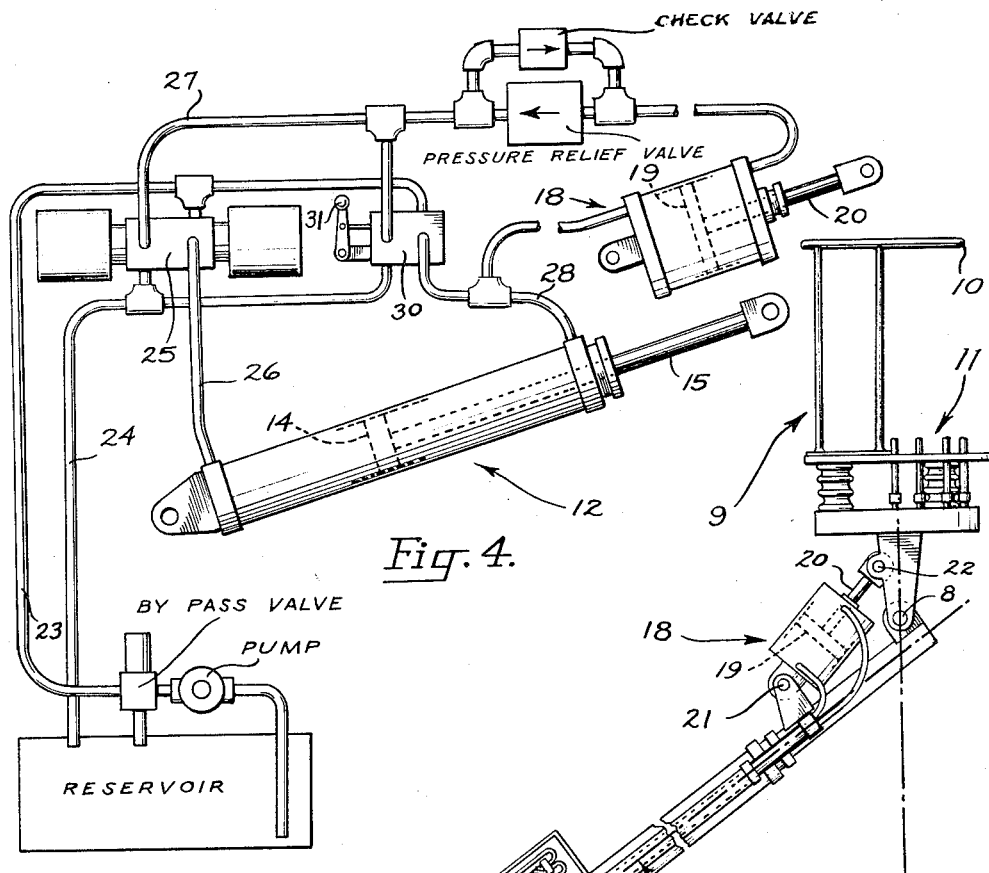
Figure 3:
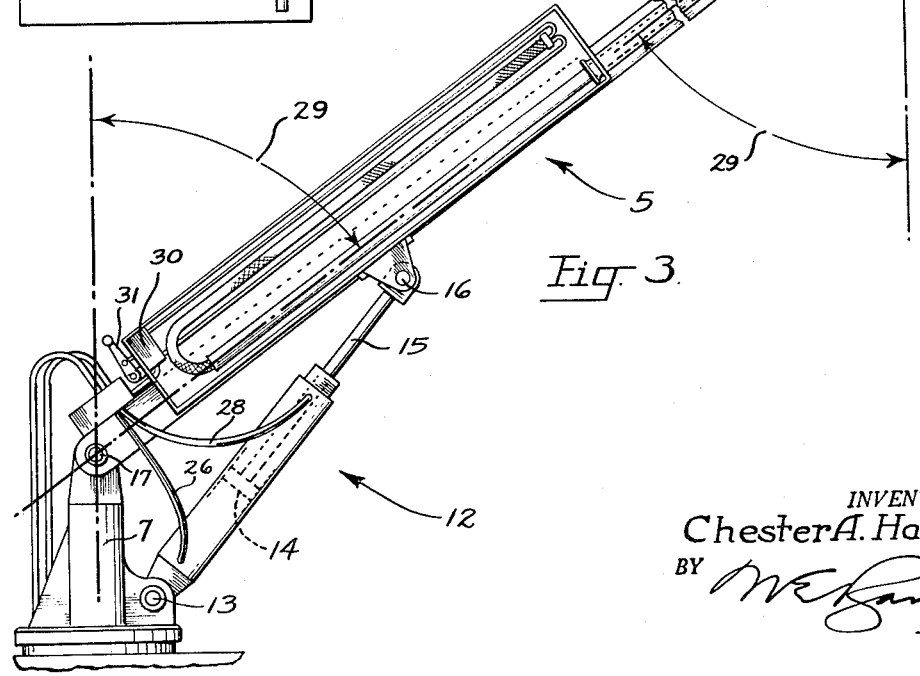

Fig. 3 is a detail view of the boom and cage with both the lift motor and the leveling motor shown in operative positions and with the opposite but equal arcuate movements of the cage and boom indicated diagrammatically by double ended arrows; and Fig. 4 is a schematic working diagram showing the various elements of the hydraulic control system as symbols indicating the relationship of these elements one to another in accord with the substance of my invention.

In the drawings, I have shown a preferred embodiment of my invention in combination with a hydraulically operated extensible boom which is indicated generally by the numeral 5. This boom best can serve the needs of a public utility maintenance crew if it is portable. Accordingly, I prefer to mount the boom upon the chassis of a truck 6 by utilizing a base 7. Adjacent the free terminal end of the boom 5, a pivotal mounting structure 8 is provided for a workman's cage 9. This workman's cage is provided with a safety rail 10 and with a foot control panel 11. As will be understood by those skilled in the art, the boom 5 is capable of following three independent paths of movement. These movements are selectable from the cage 9 by manipulation of the appropriate foot controls 11.

To effect the three separate paths of boom movement, three separate motors may be employed. However, the only motor which is important to an understanding of the instant invention is the expansible hydraulic motor 12 which pivots the boom up and down between a horizontal and vertical position. In detail, this motor is mounted, as at 13, pivotally upon the base member 7. It includes a movable piston 14, having a piston rod 15 which is joined pivotally, as at 16, to the boom 5. Additionally, the boom itself is mounted pivotally, as at 17, upon the base member 7 in order that expansion of the motor 12 will lift the boom and the contraction of the motor will lower the boom.

Referring now to the details of the leveling motor, the numeral 18 identifies an expansible hydraulic motor having a movable piston 19 with a piston rod 20. The motor 18 pivotally is joined, as at 21, to the free end of the boom 5 and the piston rod 20 similarly is joined, as at 22, to the supporting structure of the workman cage 9. Thus, expansion and contraction of the motor 18 will move the cage 9 in an arc, the various elements of the motor being proportioned so that the cage can be pivoted through an arc of at least 90 degrees.

In Fig. 4, I have shown a schematic working diagram of the leveling control mechanism with certain of the various elements thereof indicated symbolically. Thus, the expansible lift motor 12 and the expansible leveling motor 18 are shown interconnected by various conduits, certain of these conduits being illustrated as shortened. Additionally, a reservoir for hydraulic fluid is indicated in combination with a pump and a by-pass thereof whereby a supply conduit 23 continuously is provided with hydraulic fluid under pressure and an exhaust conduit 24 is provided to drain back into the reservoir. As will be apparent to those skilled in the art, a four-way valve 25 is joined to the supply and exhaust conduits and is provided with oppositely acting motor ports or conduits 26 and 27, respectively. The first motor conduit 26 is joined to a first end of the lift motor 12 and the second conduit 27 is joined to the opposite or second end of the leveling motor 18 across a check valve and pressure relief valve. Additionally, as an important feature of my invention, an intermediate conduit 28 is provided serially to interconnect the second end of the lift motor 12 and the first end of the leveling motor 18.

With the hydraulic structure thus far described, operation of the expansible lift motor 12 automatically will operate the expansible leveling motor 18 so as to correlate the pivotal movements of the boom with the pivotal movements of the cage 9. Thus, in one position of the four-way valve 25, a supply of pressure fluid is fed to the lower or first end of the lift motor 12 via the supply conduit 23 and motor conduit 26. Simultaneously therewith, fluid is exhausted from the upper or second end of the leveling motor 18 via the motor conduit 27, the pressure relief valve, and the exhaust conduit 24. However, in accord with the serial connection of the upper or second end of the lift motor 12 and lower or first end of the leveling motor 18, hydraulic fluid will be forced from the upper end of the lift motor and supplied to the lower end of the leveling motor via the intermediate conduit 28. This latter movement of pressure fluid, in accord with an important feature of my invention, correlates the movements of the piston rods 15 and 20 so as to duplicate the angular movement of the boom at the cage. Because this correlation of movement is important, a typical method of constructing the leveling mechanism now will be described.

To the above end, a lift motor 12 first is selected such that the force of power generated thereby is sufficient to pivot a boom of the desired structural strength. For example, the lift motor 12 initially may be selected such that a hydraulic pressure of 600 pounds per square inch is sufficient to lift a 32 foot boom carrying 500 pounds at the terminal end or in the workman's cage 9. Secondly, a leveling motor 18 is selected such that the volume on the lower side thereof is equal to the volume on the upper side of the lift cylinder, a factor of motor stroke being included such that a compact or short lift motor may be utilized. Thirdly, a layout diagram is utilized to plot a stroke of the lift cylinder for each 15 degrees or so of elevation from zero to 90 degrees. This stroke then is converted to volumetric displacement on the upper half of the lift motor 12 for each 15 degrees. Thereafter, by correlating the volumetric displacements for each 15 degrees of the upper half of the lift motor and the lower half of the leveling motor, an ideal stroke is obtained for the leveling motor. From this point on, either a mathematical relationship may be developed or a trial and error test may be made. With the trial and error method, the pivot points 21 and 22 for the leveling motor 18 arbitrarily are selected and the corresponding arcuate movements of the cage 9 plotted on the layout of the similar movements for the boom 5. If these layouts do not exactly match, one of the pivots 21 or 22 is moved while the other is kept constant. A second trial and error computation then is made. Eventually, an exact position for the pivot points 21 and 22 will be discovered. This exact disposition of the pivots and expansible motor elements can be made as exact as desired. For example, I prefer to utilize an exact location having a tolerance of less than 1/16 of an inch when constructing the 32-foot model of my boom. With such an interrelationship, I am assured that the boom and cage will pivot through opposite and equal arcs as indicated by the double ended arrows 29 in Fig. 3. That is to say, the stroke of the lift motor 12 will be correlated to the stroke of the leveling motor 18 such that a 15 degree movement of the boom 5 exactly will be counterbalanced or followed by a 15 degree arcuate movement of the workman's cage 9. Accordingly, if the cage initially is set to a level position, such a level disposition will be maintained throughout the range of vertical movement of the boom 5.

Returning now to Fig. 4, it will be noted that the motor conduit 27 has been provided with an oppositely acting, yet parallel, check valve and pressure relief valve. These parallel elements have replaced a conventional conduit for a particular purpose. Thus, when the boom is being lifted and fluid is being exhausted from the upper or second end of the leveling motor 18, it will be noted that the fluid is returned to the reservoir via the motor conduit 27 and the exhaust conduit 24. However, if no back pressure were maintained while the cage was loaded more heavily on one side than on the other, the leveling motor 18 would become free running and the cage might tilt or overrun. Accordingly, I prefer to utilize the pressure relief valve shown in the diagram of Fig. 4 and to set this relief valve at an exemplary pressure of 100 pounds per square inch. In this manner, a back pressure is always evidenced upon the upper or second end of the leveling motor 18 so that the cage 9 cannot tilt inadvertently or overrun should an unbalanced load be carried thereby.

As a further feature of my invention, I have provided a manual four-way valve 30 having a control handle 31. As is evident, this valve is joined to the supply conduit 23 and exhaust conduit 24. Additionally, the two motor ports of this valve are joined, respectively, to the motor conduit 27 and to the intermediate conduit 28. Accordingly, in one position of the manual valve 30, pressure fluid is supplied to the intermediate conduit 28 while it is exhausted from the upper or second end of the leveling motor 18. Oppositely, pressure fluid may be exhausted from the upper or second end of the leveling motor 27 while it is supplied to the intermediate conduit 28. Thus, I am able to effect an initial or terminal adjustment of the arcuate position of the cage 9 by manipulation of the control handle 31 and the manual valve 30. For example, the cage 9 may be pivoted to a horizontal position so as to clear overhead obstructions merely by supplying pressure fluid to the intermediate conduit 28 while exhausting it from the upper or second end of the leveling motor. In effect, the pressure fluid thus supplied to the intermediate conduit 28 will expand the leveling motor while contracting the lift motor 12. However, if the lift motor 12 previously has been positioned at the lower end of a stroke, as by lowering the boom to a horizontal position, only the cage will then be pivoted and the desired horizontal position thereof will be effected.

In summary, it will be seen that I have provided a control system which correlates the pivotal movements of a boom with the articulation of a cage in order to level the cage continuously and automatically at all angular positions of the boom. In accord with an important advantage of my invention, this fluid control system utilizes a minimum of hydraulic operating elements and provides a minimum weight compensating apparatus at the free end of the boom while at the same time providing a more precise and accurate leveling operation.

I claim:

1. In combination, a telescopic boom having a first motor means for pivoting the boom between a horizontal and a vertical position, a normally level cage carried upon the free end of said boom and having a second motor means for pivoting the cage in an arc, and control means serially interconnecting said first and second motor means for pivoting the cage in said arc and for simultaneously pivoting the boom between said positions to maintain the cage in said normal level disposition at all angular positions of the boom.

2. In combination with a boom mounted for pivotal movement between a horizontal and a vertical position, a hydraulically operated lift expansible motor means joined to the lower end of said boom for effecting said pivotal movement, a workman's cage carried pivotally adjacent the free terminal end of said boom, a hydraulically operated leveling expansible motor means interconnecting said cage and said free terminal end, a hydraulic pressure means serially interconnecting both said expansible motors to correlate the pivotal movements of said cage and boom in equal angular travel, and a manual valve means joined with said last named means for effecting a pivotal adjustment of said leveling motor independent of said lift motor.

3. In combination with a boom mounted for pivotal movement between a horizontal and a vertical position, a lift motor means for effecting said pivotal movement, a cage carried pivotally adjacent the free terminal end of said boom, a leveling motor means interconnecting said cage and said free terminal end, and means serially interconnecting both said expansible motors to correlate the pivotal movements of said cage and boom in equal angular travel.

4. In combination with a mobile base member, a boom mounted upon said base member for pivotal movement along an arcuate path between a horizontal and a vertical position, an expansible lift motor means interconnecting said boom and base member selectively to effect said pivotal movement along said arcuate path, a normally level cage mounted upon the free end of said telescopic boom for pivotal movement along an arcuate path of at least 90 degrees, an expansible leveling motor means interconnecting said free end and cage selectively to effect the pivotal movement of the cage along said arcuate path, said leveling motor having a shorter stroke and a larger bore than said lift motor, and a pressure means joined serially to said lift and leveling motor means simultaneously for pivoting the boom and cage the same number of degrees along the respective arcuate paths thereof to maintain the normal level disposition of the cage.

5. In combination with a mobile base member, an elongated telescopic boom mounted upon said base member for pivotal movement along an arcuate path between a horizontal and a vertical position, an expansible hydraulic lift motor means interconnecting said boom and base member selectively to effect said pivotal movement along said arcuate path, a normally level cage mounted upon the free end of said telescopic boom for pivotal movement along an arcuate path of at least 90 degrees, an expansible hydraulic leveling motor means interconnecting said free end and cage selectively to effect the pivotal movement of the cage along said arcuate path, and a hydraulic pressure means joined serially to said lift and leveling motor means simultaneously for pivoting the boom and cage the same number of degrees along the respective arcuate paths thereof to maintain the normal level disposition of the cage as the boom is raised and lowered, said hydraulic pressure means including a pressure conduit interconnecting one side of said expansible lift motor with the opposite side of said expansible leveling motor.

6. In combination with a mobile base member, a boom mounted upon said base member for pivotal movement along an arcuate path between a horizontal and a vertical position, an expansible lift motor means interconnecting said boom and base member selectively to effect said pivotal movement along said arcuate path, a normally level cage mounted upon the free end of said telescopic boom for pivotal movement along an arcuate path of at least 90 degrees, an expansible leveling motor means interconnecting said free end and cage selectively to effect the pivotal movement of the cage along said arcuate path, and a pressure means joined serially to said lift and leveling motor means simultaneously for pivoting the boom and cage the same number of degrees along the respective arcuate paths thereof to maintain the normal level disposition of the cage, said pressure means including a pressure conduit interconnecting one side of said expansible lift motor with the opposite side of said expansible leveling motor, the other sides of said expansible motors being joined to the respective motor ports of a four way valve means having a supply port, an exhaust port, and two motor ports.

7. In combination, a portable base member operatively carrying an extensible telescopic boom, said boom being mounted for pivotal movement about a horizontal axis through an arc of at least 90 degrees, a normally level cage member mounted upon the free end of said boom for pivotal movement about a horizontal axis through an arc of at least 90 degrees, an expansible hydraulic lift motor joined pivotally to said boom and base members and an expansible hydraulic leveling motor joined pivotally to said free end and cage, each of said motors having a piston movable between first and second ends of a corresponding cylinder, and a pressure-type hydraulic system including supply and exhaust conduits for actuating said expansible motor simultaneously to pivot the boom and cage through opposite equal arcs, said hydraulic system including an intermediate conduit interconnecting the first end of said expansible lift motor with the second end of said expansible leveling motor, said system further including a valve means joined to said supply and exhaust conduits and, by other conduits, to said motors selectively to exhaust the second end of said lift motor while supplying the first end of said leveling motor and vice versa.

8. In combination with a boom mounted upon a base member for pivotal movement about a horizontal axis through an arc of at least 90 degrees, a normally level cage member mounted upon the free end of said boom for pivotal movement about a horizontal axis through an arc of at least 90 degrees, an expansible hydraulic lift motor joined pivotally to said boom and base members and an expansible hydraulic leveling motor joined pivotally to said free end and cage, each of said motors having a piston movable between first and second ends of a corresponding cylinder, and a pressure-type hydraulic system including supply and exhaust conduits selectively for actuating said expansible motors simultaneously or separately, said hydraulic system including an intermediate conduit interconnecting the first end of said expansible lift motor with the second end of said expansible leveling motor, the strokes and volumetric capacities of said hydraulic motors being correlated to pivot the boom and cage through opposite equal arcs thereby to maintain the level condition of the cage, and oppositely acting check and pressure relief valve means joined in parallel to the second end of said leveling motor to maintain a positive leveling force upon the cage during movement of the boom.

9. In combination with a boom mounted upon a base member for pivotal movement about a horizontal axis through an arc of at least 90 degrees, a normally level cage member mounted upon the free end of said boom for pivotal movement about a horizontal axis through an arc of at least 90 degrees, an expansible hydraulic lift motor joined pivotally to said boom and base members and an expansible hydraulic leveling motor joined pivotally to said free end and cage, each of said motors having a piston movable between first and second ends of a corresponding cylinder, and a pressure-type hydraulic system including supply and exhaust conduits selectively for actuating said expansible motors simultaneously or separately, said hydraulic system including an intermediate conduit interconnecting the first end of said expansible lift motor with the second end of said expansible leveling motor, said system further including a valve means joined to said supply and exhaust conduits and, by other conduits, to said motors selectively to exhaust the second end of said lift motor while supplying the first end of said leveling motor and vice versa, said leveling motor having a shorter stroke and a larger bore than said lift motor with the strokes and volumetric capacities of the hydraulic motors being correlated to pivot the boom and cage through opposite equal arcs thereby to maintain the level condition of the cage, oppositely acting check and pressure relief valve means joined in parallel to the second end of said leveling motor to maintain a positive leveling force upon the cage during movement of the boom, and a manual valve means carried adjacent said base member and joined to both ends of said leveling motor to effect an initial or terminal adjustment of the attitude of said cage.

10. A hydraulic boom and control system, comprising means simultaneously for leveling a pivotally mounted cage at the end of a pivotal lift boom and for moving the boom between a horizontal and a vertical position, said means including a supply and an exhaust conduit joined to a valve means having two oppositely acting motor ports, said means also including a leveling motor cylinder interconnecting the free end of said boom and said cage and a lift motor cylinder bearing on the base of said boom, each of said motor cylinders having first and second ends on the respective sides of a movable piston, the first end of said leveling motor cylinder and the second end of said lift motor cylinder being joined by an intermediate conduit, one of said valve motor ports being connected by a first conduit to the second end of said leveling motor cylinder and the other motor port being connected to the first end of said lift motor cylinder to correlate the movements of the leveling and lift motor pistons.

11. A hydraulic boom and control system, comprising means simultaneously for leveling a pivotally mounted cage at the end of a pivotal lift boom and for moving the boom between a horizontal and a vertical position, said means including a supply and an exhaust conduit joined to a valve means having two oppositely acting motor ports, said means also including a leveling motor cylinder interconnecting the free end of said boom and said cage and a lift motor cylinder bearing on the base of said boom, each of said motor cylinders having first and second ends on the respective sides of a movable piston, the first end of said leveling motor cylinder and the second end of said lift motor cylinder being joined by an intermediate conduit, one of said valve motor ports being connected by a first conduit to the second end of said leveling motor cylinder and the other motor port being connected to the first end of said lift motor cylinder to correlate the movements of the leveling and lift pistons, said first conduit having oppositely acting parallel check and pressure relief valve means for restricting the exhaust of pressure fluid from, but for freely passing the supply of pressure fluid to, said leveling motor cylinder.

12. A hydraulic boom and control system, comprising means simultaneously for leveling a pivotally mounted cage at the end of a pivotal lift boom and for moving the boom between a horizontal and a vertical position, said means including a supply and an exhaust conduit joined to a valve means having two oppositely acting motor ports, said means also including a leveling motor cylinder interconnecting the free end of said boom and said cage and a lift motor cylinder bearing on the base of said boom, each of said motor cylinders having first and second ends on the respective sides of a movable piston, the first end of said leveling motor cylinder and the second end of said lift motor cylinder being joined by an intermediate conduit, one of said valve motor ports being connected by a first conduit to the second end of said leveling motor cylinder and the other motor port being connected to the first end of said lift motor cylinder to correlate the movements of the leveling and lift motor pistons, said first conduit having oppositely acting parallel check and pressure relief valve means for restricting the exhaust of pressure fluid from, but for freely passing the supply of pressure fluid to, said leveling motor cylinder, and a manual valve means interconnecting said first and intermediate conduits selectively to move said leveling motor piston, only, when said lift piston is positioned at the first end of a stroke.

References Cited in the file of this patent

UNITED STATES PATENTS

| | | |
|---|---|---|
| 1,558,002 | Ferris | Oct. 20, 1925 |
| 1,994,974 | Wiedmann | Mar. 19, 1935 |
| 2,100,445 | Le Bleu | Nov. 30, 1937 |
| 2,109,392 | Le Bleu | Feb. 22, 1938 |
| 2,112,466 | Maloon | Mar. 29, 1938 |
| 2,606,078 | Brock | Aug. 5, 1952 |
| 2,613,822 | Stanley | Oct. 14, 1952 |
| 2,637,259 | Acton | May 5, 1953 |

FOREIGN PATENTS

| | | |
|---|---|---|
| 500,673 | Great Britain | Feb. 14, 1939 |